Dec. 17, 1929.  W. C. CARR  1,739,708
INDUSTRIAL TRUCK
Filed Nov. 3, 1926  2 Sheets-Sheet 1
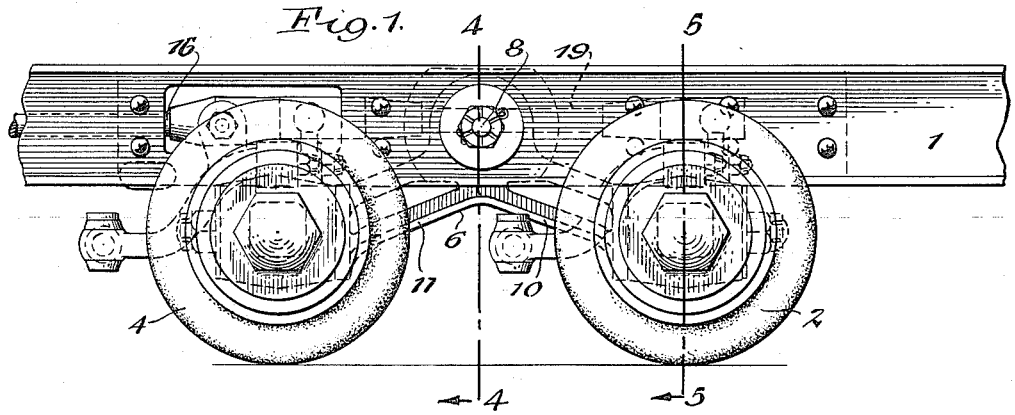
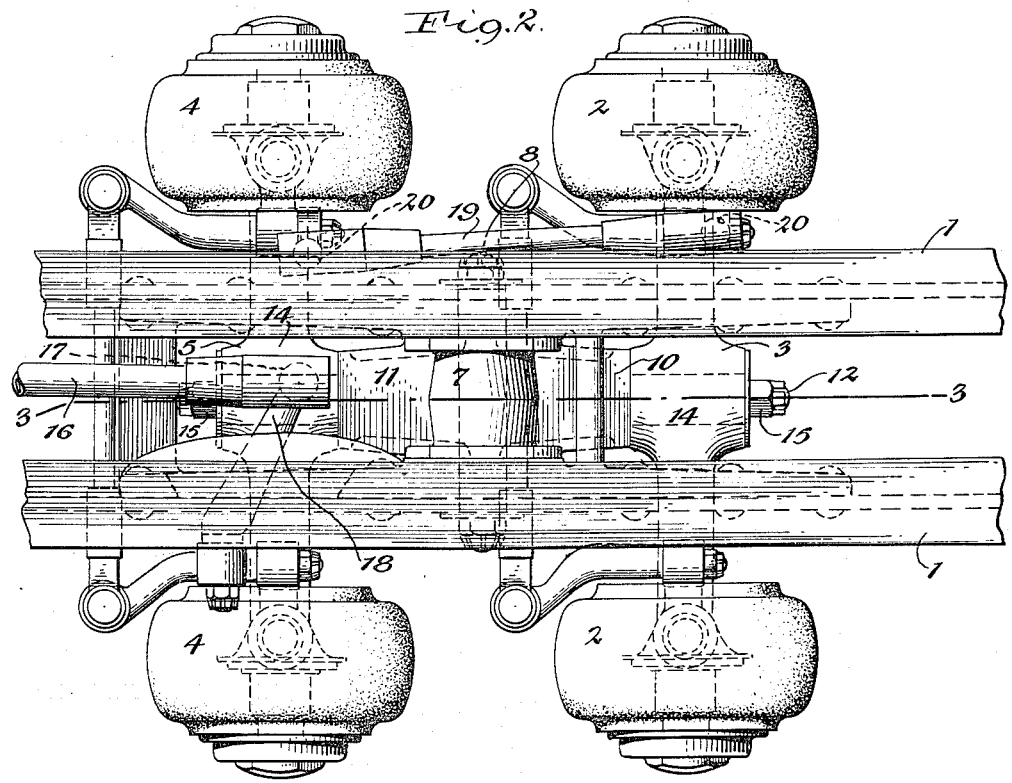
Inventor
WILLIAM C. CARR
by Popp and Powers
Attorneys Dec. 17, 1929.                W. C. CARR                1,739,708
                            INDUSTRIAL TRUCK
                          Filed Nov. 3, 1926              2 Sheets-Sheet 2
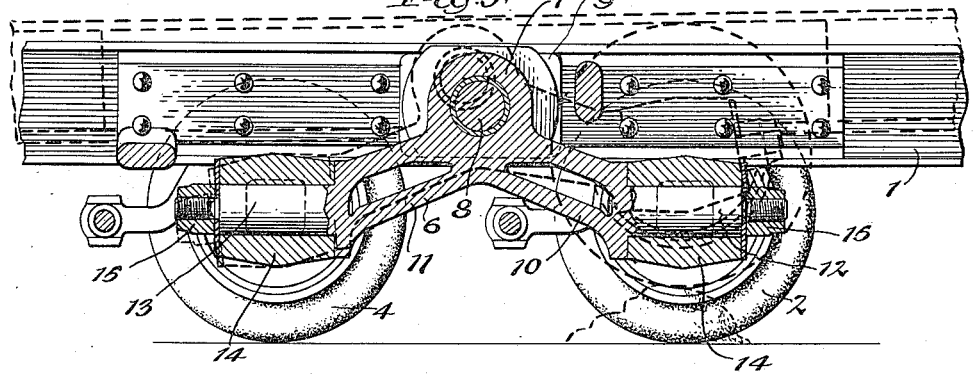
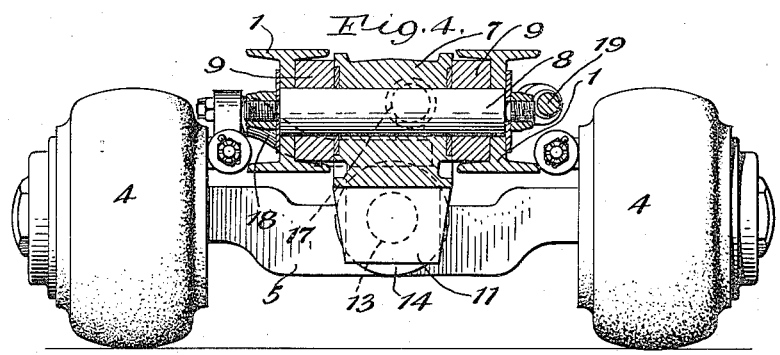
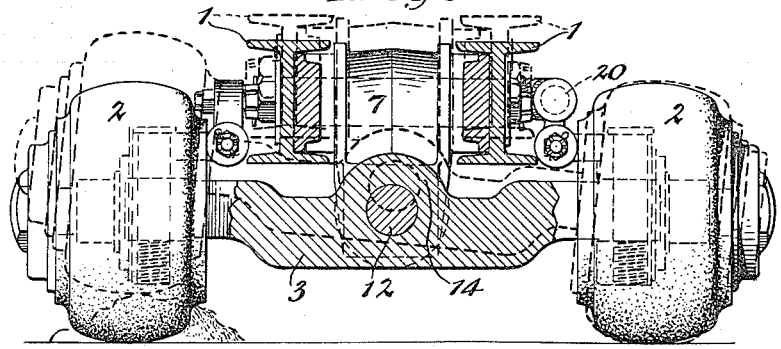
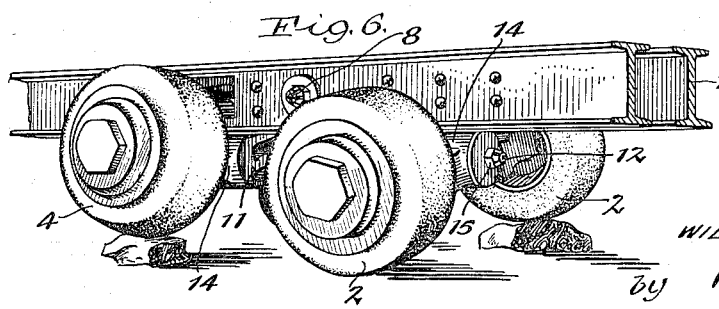
Inventor
WILLIAM C. CARR
by Popp and Powers
Attorneys Patented Dec. 17, 1929

1,739,708

UNITED STATES PATENT OFFICE

WILLIAM C. CARR, OF BUFFALO, NEW YORK, ASSIGNOR TO THE AUTOMATIC TRANSPORTATION COMPANY, INC., OF BUFFALO, NEW YORK, A CORPORATION OF NEW YORK

INDUSTRIAL TRUCK

Application filed November 3, 1926. Serial No. 145,983.

This invention relates to improvements in industrial trucks such as are provided with load supporting platforms and are used in manufacturing establishments for the quick and easy transportation of objects or materials from one point to another, the loads being placed on the platforms either directly or by means of loading skids.

The invention relates more particularly to the front wheel support for the chassis and its objects are to enable the chassis to be set at a desirably low elevation and safely to carry heavy loads over rough surfaces or surface obstructions without the aid of springs. For the accomplishment of these objects the invention proposes a four-wheel supporting unit which may rock about a central transverse axis relatively to the chassis and wherein each pair of front or rear wheels of the unit as the case may be, may rock independently of the other pair about a central longitudinal axis. The unit thus characterized is arranged symmetrically of the chassis under the load supporting platform, may be exceedingly sturdy in its construction, and will ride over surface obstructions without causing any transverse tilting of the platform, with extremely slight longitudinal tilting of the platform, with extremely slight longitudinal tilting of the platform about a long axis taken from the rear wheels of the truck, and with minimum vertical displacement of the platform. It follows that the presence of surface obstructions along the line of travel has no more, if as much effect, upon the stability of the platform than if heavy supporting springs were employed while at the same time all spring and shock absorber complications and expense are avoided and the platform may be set at the very low elevation which is desirable in industrial trucks intended for inter- or intra-plant haulage.

An embodiment of the invention is illustrated in the accompanying drawings in which:

Figure 1 is a side elevation of the improved supporting unit showing its relation to the chassis.

Figure 2 is a top plan view thereof.

Figure 3 is a central longitudinal sectional view thereof.

Figures 4 and 5 are cross sections on the respective lines 4—4 and 5—5 of Figure 1.

Figure 6 is a perspective view of the supporting unit.

Those portions of the side bars of the chassis which are arranged under and which carry the vertically movable load supporting platform (not shown) are indicated at 1. It will be understood that the industrial truck may be of any suitable construction and that except for the side bars 1 its illustration is unnecessary.

The supporting unit includes a front pair of wheels 2 mounted on an axle 3 and a rear pair of wheels 4 mounted on an axle 5. The axles 3 and 5 project under and beyond the side bars 1 and are carried by a yoke 6 arranged longitudinally and centrally between said side bars. The yoke 6 is provided with a central knuckle 7 which is pivotally mounted upon the transverse supporting pin 8 extending between and secured to the bars 1, the yoke being held against transverse play by spacer blocks 9 fitted upon the pin 8 between the knuckle 7 and the side bars 1. Below the knuckle 7 the yoke is provided with forward and rearward projecting arms 10 and 11 which carry longitudinal spindles 12 and 13 respectively. The axles 3 and 5 are provided with centrally located knuckles 14 by which they are pivotally mounted upon the respective spindles 12 and 13, displacement of the axles from said spindles being prevented by nuts 15 secured on threaded terminal projections of the spindles.

The axles 3 and 5 are provided beyond the side bars 1 with steering knuckles upon which the wheels 2 and 4 are mounted. The steering knuckles are controlled from the rod 16 by a linkage of the usual form, the rod 16 being connected by a suitable universal joint 17 to an arm 18 which is carried by the steering knuckle of one of the wheels 4 and the steering knuckle of the other wheel 4 being connected to the steering knuckle of the wheel 2 at the same side of the truck by a link 19, said steering knuckles being coupled to said link by suitable universal joints 20. The rear wheels (not shown) of the truck may also be dirigibly mounted in the usual manner and operated from the rod 16 in connection with the operation of the wheels 2 and 4.

It will be apparent from the foregoing description that each pair of wheels 2 and 4 is universally mounted with respect to the chassis. The action of the supporting unit in riding over obstacles is illustrated in Figures 3, 5 and 6. Figures 3 and 5 show by broken lines the relation of the parts when one of the front wheels 2 rides over an obstacle. At such time the yoke rocks about the axial centers of the rear wheels 4 and the vertical displacement transmitted to the bars 1 is only about half of that of the wheel 2. In such displacement the bars 1 are moved about a long radius which extends from the rear wheels (not shown) of the truck to the pin 8 and the fore and aft inclination of the bars 1 and consequently of the load supporting platform is very slight, so slight indeed that it has no effect on the position of the load on said platform. In connection with the displacement of the yoke about the axial centers of the wheels 4 in the example assumed, the front axle 3 will tilt transversely as shown in Figure 5 but this will not cause any transverse tilting of the bars 1 and the load supporting platform inasmuch as the axle 3 in its transverse tilting action rocks relatively to the yoke and permits the latter under the weight of the supported parts to remain in a true longitudinal plane.

The same effects are observed when either of the rear wheels 4 ride over an obstacle or when a wheel of the front pair and a wheel of the rear pair simultaneously ride over obstacles as shown in Figure 6.

It will be noted that the steering linkages of the two pairs of wheels are flexibly connected by the rod 19 and universal joints 20 and that the universal joint 17 provides a flexible connection between the steering linkage of the wheels 4 and the rod 16. It follows that the above described movements of the yoke and the axles are adequately compensated with reference to the steering mechanism.

The direct connection of the yoke to the side bars 1 and to the axles 3 and 5 permits said side bars to be set at a low elevation while allowing ample clearances under the axles, these features being very desirable in the operation of industrial trucks. The reduction in the vertical displacement of the load carrying platform with reference to the displacement of the wheel which rides over the obstacle, the fact that there is no transverse tilt of the platform, the fact that the longitudinal tilt of the platform is so slight as to be negligible for practical purposes and the fact that the parts of the unit move with perfect freedom when the wheels ride over obstacles eliminates entirely the necessity of supporting springs while insuring the stability of the platform under heavy loads under conditions of rough travel.

It will, moreover, be noted that the form of the supporting unit and its arrangement with reference to the side bars 1 enables the parts of the unit to be made of such weight and strength as to permit the truck to carry heavy loads.

Having fully described my invention, I claim:

An industrial truck having a chassis provided with forwardly extended side bars and a springless front wheel supporting unit comprising a yoke having a central knuckle fitted between the side bars and forward and rearward projecting arms, a pin connected to said side bars in a plane between their tops and bottoms and extending through said knuckle, said pin providing a transverse axis about which the knuckle may rock, front and rear axles pivotally mounted at their centers on said arms for movement about longitudinal axes, said axles projecting under and beyond said side bars, and supporting wheels mounted on the end of said axles.

In testimony whereof I affix my signature.

WILLIAM C. CARR.